United States Patent
Hsu

(10) Patent No.: US 9,118,729 B2
(45) Date of Patent: Aug. 25, 2015

(54) METHOD FOR SHARING RESOURCE OF A VIDEOCONFERENCE USING A VIDEO CONFERENCING SYSTEM

(75) Inventor: Ming-Chung Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 882 days.

(21) Appl. No.: 13/290,142

(22) Filed: Nov. 7, 2011

(65) Prior Publication Data

US 2012/0236109 A1    Sep. 20, 2012

(30) Foreign Application Priority Data

Mar. 17, 2011 (CN) .......................... 2011 1 0064445

(51) Int. Cl.
| | |
|---|---|
| H04N 7/14 | (2006.01) |
| H04L 29/08 | (2006.01) |
| H04N 7/15 | (2006.01) |
| H04L 29/06 | (2006.01) |
| H04M 3/56 | (2006.01) |

(52) U.S. Cl.
CPC .......... H04L 67/2823 (2013.01); H04L 65/403 (2013.01); H04L 67/303 (2013.01); H04N 7/152 (2013.01); H04M 3/567 (2013.01)

(58) Field of Classification Search
CPC ....................................................... H04N 7/14
USPC ................................ 348/14.09, 14.12, 14.08
See application file for complete search history.

(56) References Cited

U.S. PATENT DOCUMENTS 5,915,091 A * 6/1999 Ludwig et al. ................ 709/204
2009/0292999 A1   11/2009 La Bine et al.

FOREIGN PATENT DOCUMENTS

| CN | 101645952 A | 2/2010 |
|---|---|---|
| CN | 101645952 A | 2/2010 |
| CN | 101789955 A | 7/2010 |
| CN | 101330340 B | 9/2010 |

* cited by examiner

*Primary Examiner* — Olisa Anwah
(74) *Attorney, Agent, or Firm* — Novak Druce Connolly Bove + Quigg LLP

(57) ABSTRACT

A resource sharing method for sharing user interfaces and multimedia files uses a video conferencing system which includes at least one computer, a local video terminal, a multipoint control unit (MCU), and at least one remote video terminal. The resource method includes steps where the at least one computer analyzes the format of the multimedia files and determines whether or not the local video terminal can support the format(s) of the multimedia files. The at least one computer may transmit the multimedia file(s) to the local video terminal and a multipoint control unit (MCU) and to the at least one remote video terminal through the MCU.

20 Claims, 4 Drawing Sheets

METHOD FOR SHARING RESOURCE OF A VIDEOCONFERENCE USING A VIDEO CONFERENCING SYSTEM

BACKGROUND

1. Technical Field

The disclosure generally relates to telecommunications, and more particularly to a method for sharing resource of a videoconference using a video conferencing system.

2. Description of the Related Art

A video conferencing system usually includes a computer, a multipoint control unit (MCU), at least one local video terminal, and at least one remote video terminal, which allows two or more locations to interact through two-way video and audio transmissions.

The computer may be electrically connected to the at least one local video terminal by means of video graphics array (VGA) cables and VGA connectors to transmit data, which increases costs. The MCU is in electronic communication with the local video terminals and the remote video terminals to transmit audio files or other computer-displayed information to the remote video terminals. However, any large video and audio streams (e.g., multimedia files) may result in data congestion and transmission delay.

Therefore, there is room for improvement within the art.

BRIEF DESCRIPTION OF THE DRAWINGS

Many aspects of a method for sharing resource of a videoconference using a video conferencing system can be better understood with reference to the following drawings. The components in the drawings are not necessarily drawn to scale, the emphasis instead being placed upon clearly illustrating the principles of the method for sharing resource of a videoconference using a video conferencing system. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
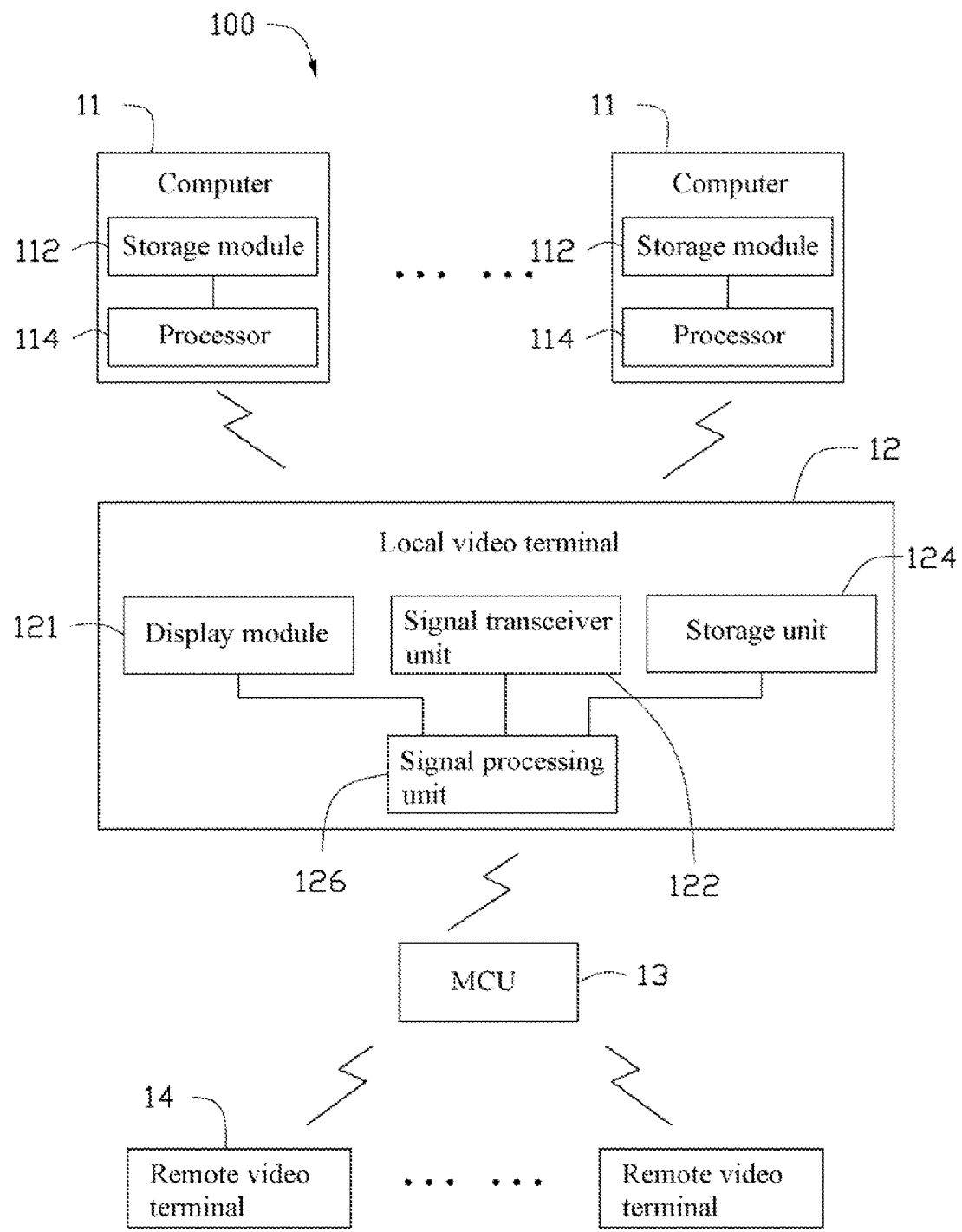
FIG. 1 is a block view of one embodiment of a video conferencing system for executing a method for sharing resource of a videoconference, according to the disclosure.

FIG. 1 shows a block view of one embodiment of a video conferencing system 100 for executing a method for sharing resource of a videoconference, according to the disclosure. The video conferencing system 100 allows two or more locations to interact via two-way video and audio transmissions, and enables people in different locations to take part in a "virtual" meeting, by seeing, hearing and taking part in the audio and video transmission of meeting activities, and in the display and editing of documents, whiteboard activities, and other computer-displayed information.

In this embodiment, the video conferencing system 100 includes at least one computer 11, a local video terminal 12, a multipoint control unit (MCU) 13, and at least one remote video terminal 14. The at least one computer 11 may integrate different components, carry out digital compression and decompression of audio and video streams in real time, and initiate and maintain data linkage(s) via an analog or digital network, such as a local area network or the Internet. In this embodiment, each computer 11 can be implemented as a data sharing server, and includes a storage module 112 and a processor 114 electrically connected to the storage module 112. The storage module 112 can be a flash, a programmable read-only memory, or other memory devices to pre-store different information and signals. The processor 114 can be a central processing unit (CPU) and carries out the functions of the computer 11.

In this embodiment, the local video terminal 12 can be a videoconference box, personal computer (PC), or notebook PC, and is in electronic communication with the at least one computer 11. The local video terminal 12 is implemented as a data sharing client that may pre-store client wireless communication protocols or software. The local video terminal 12 may establish a wireless communication(s) with each computer 11 based on the client data sharing software and the server data sharing software to transfer live video and audio streams, documents and computer-displayed information, for example.

The local video terminal 12 includes a display module 121, a signal transceiver unit 122, a storage unit 124, and a signal processing unit 126. The display module 121 can be a touch panel or touch screen to display, input and output information and signals. The signal transceiver unit 122 is capable of receiving and transmitting signals. The storage unit 124 can be a flash, a programmable read-only memory, or other memory devices to pre-store different information and signals. The signal processing unit 126 is electrically connected to the display module 121, the signal transceiver unit 122 and the storage unit 124, and can be central processing unit (CPU) and carries out the functions of the local video terminal 12. The local video terminal 12 can remotely access any computer 11, and display locally the user interface or screen of any computer 11 according to a remote frame buffer (RFB) protocol. The local video terminal 12 can further show and provide the user interface or screen of the at least one computer 11 to any remote video terminal 14 through the MCU 13, so that each remote video terminal 14 can share the user interface or the screen of the at least one computer 11 with the local video terminal 12 in real time.

In addition, when the local video terminal 12 shares the multimedia files with the at least one remote video terminal 14 through the MCU 13, the at least one computer 11 may process and analyze the file formats of each of the multimedia files, and convert, or compress, or decompress as necessary the file formats of the multimedia files into corresponding format(s) which are supported and available on the local video terminal 12. The local video terminal 12 may receive and transmit the multimedia files (converted or unconverted as appropriate) to the remote video terminals 14 via the MCU 13 so as to share the multimedia files with the at least one remote video terminal 14.

In this embodiment, the MCU 13 is in electronic communication with the local video terminal 12, and is a device used to invoke videoconferencing connections that provides the capability for the at least one remote video terminal 14 to participate in a multipoint conference. The at least one remote video terminal 14 can be a notebook PC, PC, or videoconference box, and is in electronic communication with the MCU 13.

Figure 2:
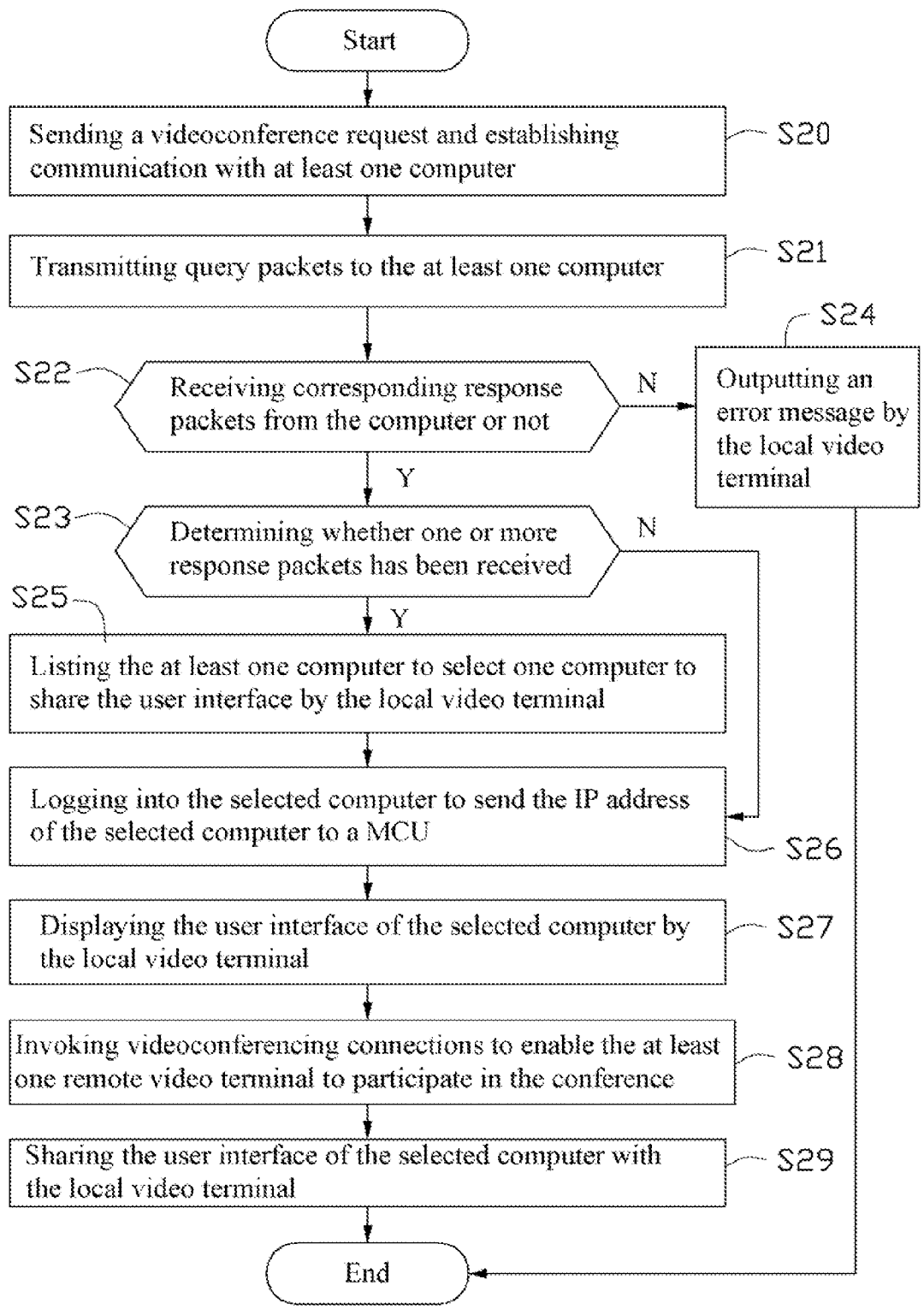
FIG. 2 is a flowchart of the resource sharing method for sharing a user interface or screen, according to one embodiment of the disclosure.
Figure 3:
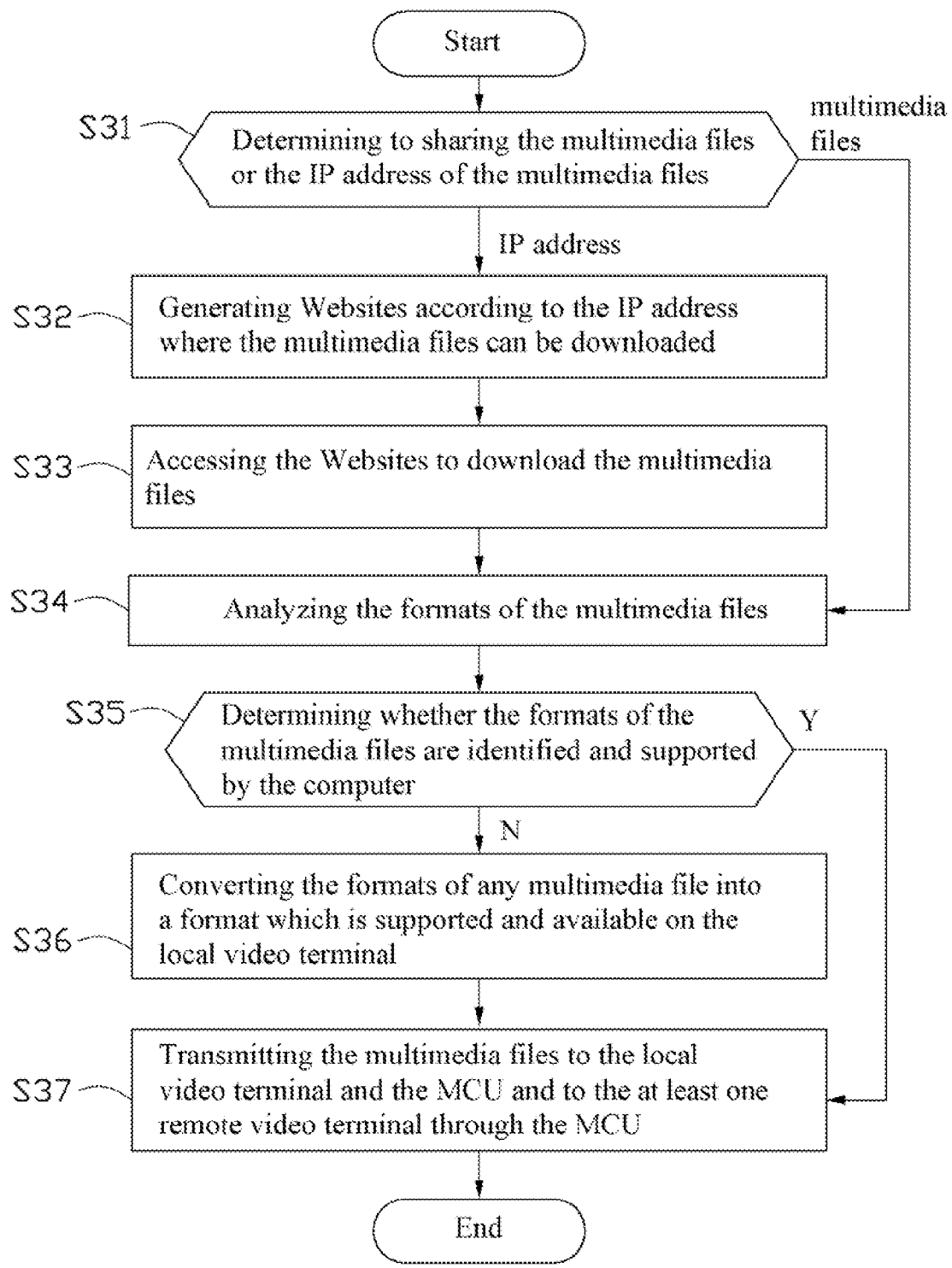
FIG. 3 is a flowchart of a multimedia sharing method having a step of S37 included in the resource sharing method of the disclosure.

Also referring to FIGS. 2 and 3, a method for sharing for sharing user interfaces and multimedia files between the local video terminal 12 and the at least one remote video terminal 14, according to an embodiment of the disclosure, is depicted. The method for sharing user interfaces can use the aforementioned video conferencing system 100, and may include at least the following steps.

In step S20, the signal transceiver unit 122 of the local video terminal 12 sends a videoconference request to establish communication with the at least one computer 11.

In step S21, the signal transceiver unit 122 of the local video terminal 12 sends or broadcasts query packets to the at least one computer 11.

In step S22, the signal transceiver unit 122 of the local video terminal 12 may or may not receive corresponding response packets according to the query packets from the at least one computer 11. If the local video terminal 12 receives any response packets from the at least one computer 11, then the method proceeds to step S23; but if the local video terminal 12 fails to receive any responding packets from the at least one computer 11, then the method proceeds to step S24.

In step S23, the signal processing unit 126 of the local video terminal 12 determines whether one or more response packets has been received. If the signal processing unit 126 of the local video terminal 12 receives more than one response packet, to indicate communications with more than one of the computers 11, then the method proceeds to step S25. If the signal processing unit 126 receives only one response packet, to indicate communication with any one computer 11, then the method proceeds to step S26.

In step S24, since the local video terminal 12 failed to receive any response packet from the at least one computer 11, the local video terminal 12 outputs an error message from the storage unit 124 of the local video terminal 12 on the user interface and the method ends.

In step S25, since the signal transceiver unit 122 of the local video terminal 12 has received more than one response packet from more than one of the computers 11, the display module 121 of the local video terminal 12 lists and displays all the computers 11 and waits for a user to select one of the computers 11, to share the user interface or screen of one of the listed and displayed computers 11. Upon the user making a selection, the method proceeds to step S26

In step S26, the local video terminal 12 remotely logs into the sole responding or selected computer 11 based on the RFB protocol and sends the Internet Protocol (IP) address of the sole responding or selected computer 11 to the MCU 13.

In step S27, the display module 121 of the local video terminal 12 displays the user interface or screen of the sole responding or selected computer 11.

In step S28, the MCU 13 invokes videoconferencing connections to enable the at least one remote video terminal 14 to participate in the conference.

In step S29, the at least one remote video terminal 14 participates in sharing the user interface or screen of the sole responding or selected computer 11 with the local video terminal 12 in real time.

Referring to FIG. 3, the method for sharing multimedia files utilizes the aforementioned video conferencing system 100, and may include at least the following steps.

In step S31, the user is desirous of sharing a multimedia file (e.g., a video) or the IP address of the storage module 112 of the computer 11 in which the multimedia files are stored. If the IP address of the computer 11 is shared, then the method proceeds to step S32; if the multimedia files are directly shared, then the method proceeds to step S34.

In step S32, the processor 114 of the computer 11 generates websites or Access addresses according to the IP address, where the multimedia files can be accessible and downloaded.

In step S33, the computer 11 accesses the websites or Access addresses to download the multimedia files.

In step S34, the processor 114 of the computer 11 analyzes the format(s) of each of the multimedia files.

In step S35, the processor 114 of the computer 11 determines whether or not the local video terminal 12 can identify and support the format(s) of each of the multimedia files of the computer 11. If the local video terminal 12 is unable to identify and support the format(s) of the multimedia files, then the method proceeds to step S36; if the local video terminal 12 is able to identify and support the format(s) of the multimedia files, then the method proceeds to step S37.

In step S36, the processor 114 may convert the format(s) of any multimedia file into a format which is supported and available on the local video terminal 12.

In step S37, the processor 114 transmits the multimedia file(s) (converted or unconverted as appropriate) to the local video terminal 12 and the MCU 13, and further transmits the multimedia file(s) to the at least one remote video terminal 14 through the MCU 13. Thus, the at least one remote video terminal 14 may share the multimedia file(s) of the computer 11 with the local video terminal 12 in real time.

Figure 4:
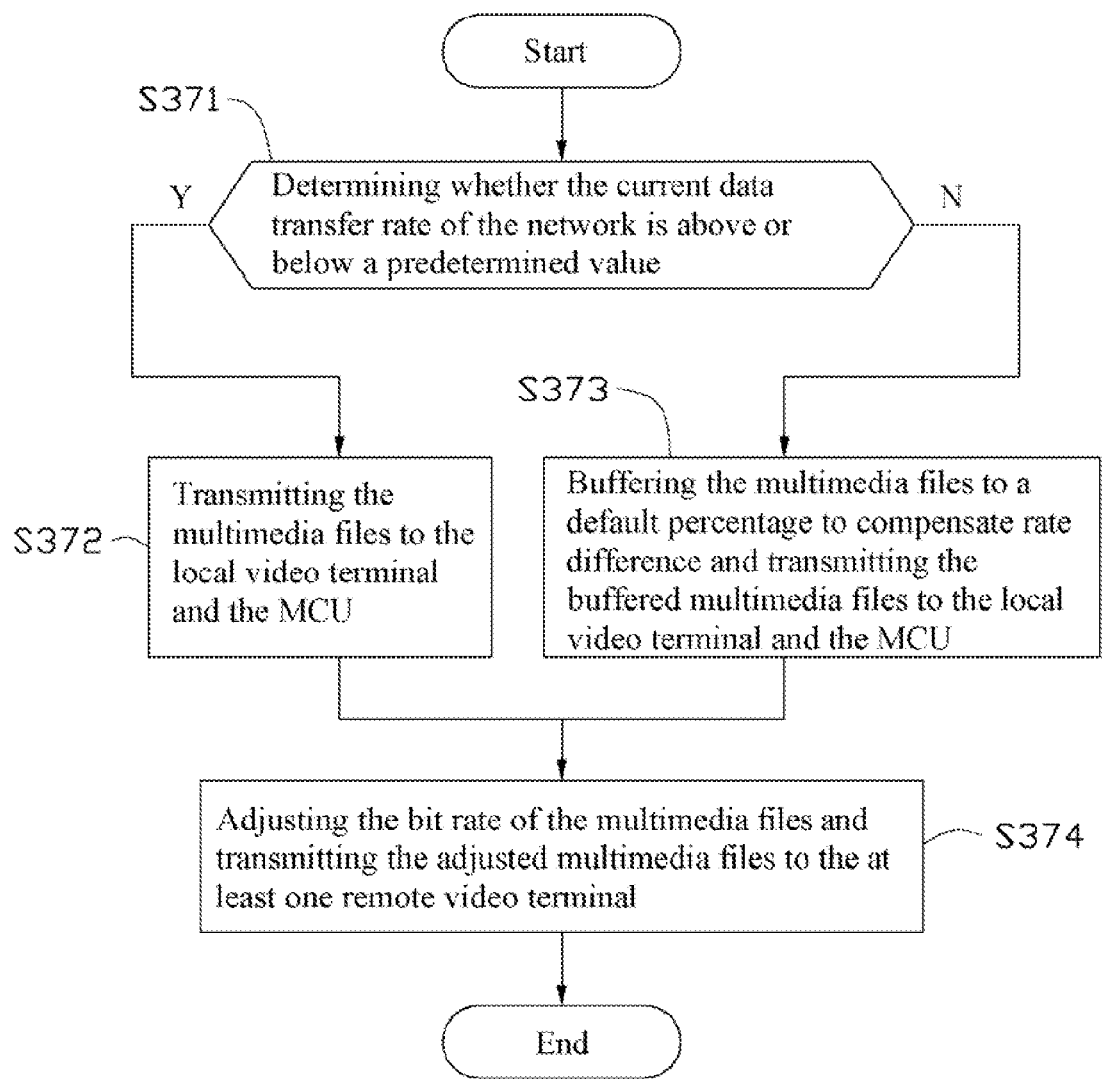
FIG. 4 is a sub-flowchart of the step of S37 shown in FIG. 3 of the disclosure.

Also referring to FIG. 4, the step S37 may include at least the following sub-steps.

In step S371, the processor 114 of the computer 11 detects the current network state to determine whether the current data transfer rate of the network is above or below a predetermined value. If the current data transfer rate exceeds the predetermined value, then the method proceeds to step S372; if the current data transfer rate is below the predetermined value, then the method proceeds to step S373.

In step S372, the multimedia files are transmitted from the computer 11 to the local video terminal 12 and the MCU 13. In this embodiment, the processor 114 buffers the multimedia files (e.g., online video streaming) to compensate for any difference between the rate at which data can be received and the rate at which it can be processed. For example, when an online video is buffered to a default percentage (e.g., 5% or 10%), the online video then can be transmitted to the local video terminal 12 and the MCU 13 without undue data congestion and transmission delay.

In step S373, since the current data transfer rate is less than the preset value, signifying congestion on the current network or the presence of bottlenecks, the processor 114 of the computer 11 firstly buffers the multimedia files to a default percentage (e.g., 20% or 25%) to compensate rate difference, and then transmits the buffered multimedia files to the local video terminal 12 and the MCU 13 to allow for data congestion and transmission delays.

In step S374, the MCU 13 backups the multimedia files from the local video terminal 12, and adjusts the bit rate of the video, and transmits the adjusted video to the at least one remote video terminal 14 to share any multimedia files with local video terminal 12 in real time.

In summary, in the resource sharing method of the disclosure, the local video terminal 12 can log into the at least one computer 11 based on the RFB protocol and access the computer 11 to share the user interface or screen of the computer 11 with the at least one remote video terminal 14. Thus, a number of video terminals can share and enjoy high-resolution audio and video. In addition, the MCU 13 can dynamically adjust the bit rate of images of the multimedia files, which can improve the sharing speed of the shared multimedia files. The present disclosure has low operating costs, but virtually universal applications.

In the present specification and claims, the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of this exemplary disclosure to the full extent indicated by the broad general meaning of the terms in which the appended claims are expressed.

What is claimed is:

1. A resource sharing method for sharing multimedia files of at least one computer between a local video terminal and at least one remote video terminal, the local video terminal in electronic communication with the at least one remote video terminal through a multipoint control unit (MCU) and a communication network, the resource sharing method comprising steps of:
   analyzing format of each of the multimedia files by a processor of the at least one computer;
   determining whether or not the local video terminal identifies and supports the format of each of the multimedia files by the processor of the at least one computer; and
   transmitting the multimedia files to the local video terminal and the MCU and to the at least one remote video terminal through the MCU by the at least one computer.

2. The resource sharing method as claimed in claim 1, further comprising converting the format of the multimedia files by the processor into a corresponding format that is supported and available by the local video terminal if the local video terminal fails to identify and support the format of the multimedia files.

3. The resource sharing method as claimed in claim 1, wherein the step of transmitting the multimedia files to the local video terminal and the at least one remote video terminal comprises sub-steps of:
   determining whether a current data transfer rate of the communication network is above or below a preset value by the processor of the at least one computer;
   delivering the multimedia files to the local video terminal and the MCU if the current data transfer rate of the communication network exceeds the predetermined value;
   buffering the multimedia files to a default percentage and sending the buffered multimedia files to the local video terminal and the MCU by the processor when the current data transfer rate is below the predetermined value; and
   adjusting bit rate of the multimedia files to transmit the adjusted multimedia files to the at least one remote video terminal by the MCU.

4. The resource sharing method as claimed in claim 1, further comprising sharing the multimedia files or Internet protocol (IP) of a storage unit of the at least one computer in which the multimedia files are store.

5. The resource sharing method as claimed in claim 4, further comprising generating websites according to the IP address by the processor where the multimedia files can be accessible and downloaded.

6. The resource sharing method as claimed in claim 5, further comprising accessing the websites to download the multimedia files.

7. The resource sharing method as claimed in claim 4, further comprising sharing user interface of the at least one computer, the user interface sharing method comprising steps of:
   logging into the at least one computer based on the remote frame buffer protocol to send the IP address of the at least one computer to the MCU;
   displaying the user interface of the at least one computer by a display module of the local video terminal;
   invoking videoconferencing connections to enable the at least one remote video terminal to join in the conference by the MCU; and
   sharing the user interface of the at least one computer with the local video terminal by the at least one remote video terminal.

8. The resource sharing method as claimed in claim 7, further comprising broadcasting query packets to the at least one computer by a signal transceiver unit of the local video terminal.

9. The resource sharing method as claimed in claim 8, further comprising determining whether the local video terminal receives corresponding response packets according to the query packets from the at least one computer or not by a signal processing unit of the local video terminal.

10. The resource sharing method as claimed in claim 9, further comprising determining one or more response packets has been received by the signal processing unit when the local video terminal receives the response packets from the at least one computer.

11. The resource sharing method as claimed in claim 10, further comprising selecting one computer to share the user interface of the selected computer when the local video terminal receives more than one response packets form the at least one computers.

12. The resource sharing method as claimed in claim 9, further comprising outputting an error message from the storage unit when the local video terminal fails to receive the responding packets from the at least one computer.

13. A resource sharing method for sharing user interface and multimedia files of at least one computer between a local video terminal and at least one remote video terminal, the local video terminal in electronic communication with the at least one remote video terminal via a multipoint control unit (MCU) and a communication network, the resource sharing method comprising steps of:
   logging into at least one computer based on remote frame buffer protocol to send Internet protocol (IP) address of the at least one computer to the MCU through the local video terminal;
   displaying the user interface of the at least one computer by the a display module of the local video terminal;
   analyzing format of each of the multimedia files by a processor of the at least one computer;
   transmitting the multimedia files to the local video terminal and the MCU by the at least one computer;
   invoking videoconferencing connections to enable the at least one remote video terminal to join in the conference by the MCU; and
   sharing the user interface and the multimedia files with the local video terminal by at least one remote video terminal.

14. The resource sharing method as claimed in claim 13, further comprising converting the format of the multimedia files by the processor into a corresponding format that is supported and available by the local video terminal if the local video terminal fails to identify and support the format of the multimedia files.

15. The resource sharing method as claimed in claim 13, wherein the step of transmitting the multimedia files to the local video terminal and the at least one remote video terminal comprises sub-steps of:
  determining whether or not a current data transfer rate of communication network is above or below a preset value by the processor of the at least one computer;
  delivering the multimedia files to the local video terminal and the MCU if the current data transfer rate exceeds the predetermined value;
  buffering the multimedia files to a default percentage and sending the buffered multimedia files to the local video terminal and the MCU by the processor when the current data transfer rate is below the predetermined value; and
  adjusting the bit rate of the multimedia files to transmit the adjusted multimedia files to the at least one remote video terminal by the MCU of the at least one computer.

16. The resource sharing method as claimed in claim 13, further comprising sharing the multimedia files or Internet protocol (IP) of the multimedia files stored within a storage unit of the at least one computer.

17. The resource sharing method as claimed in claim 16, further comprising generating websites according to the IP address by the processor where the multimedia files can be accessible and downloaded.

18. The resource sharing method as claimed in claim 13, further comprising transmitting query packets to the at least one computer to determine whether the at least one computer feeds back corresponding response packets according to the query packets.

19. The resource sharing method as claimed in claim 18, further comprising determining one or more response packets has been received by the signal processing unit when the local video terminal receives the response packets from the at least one computer.

20. The resource sharing method as claimed in claim 19, further comprising selecting one computer to share the user interface of the selected computer when the local video terminal receives more than one response packets form the at least one computers.

* * * * *